Fig. 2

INVENTOR:
CHARLES E. GREGORY

ATTORNEYS

United States Patent Office 3,509,968
Patented May 5, 1970

3,509,968
OVERSPEED CONTROL VALVE ASSEMBLY FOR A HYDROSTATIC ELEVATOR ENGINE
Charles E. Gregory, Anchorville, Mich., assignor to Jered Industries, Inc., Birmingham, Mich., a corporation of Michigan
Filed Mar. 1, 1968, Ser. No. 709,776
Int. Cl. B66b *11/04*
U.S. Cl. 187—26                 8 Claims

ABSTRACT OF THE DISCLOSURE

This specification describes a valve assembly for controlling the motion of a hydrostatic motor having a pressure operated working piston. The valve assembly includes a working pressure source and a pressure distributor valve arrangement for controlling distribution of pressure from the pressure source to the working chamber of the hydrostatic engine on one side of the piston and for controlling communication between the other side of the piston and the exhaust region. When the rate of movement of the piston exceeds a calibrated limiting value, a speed sensitive valve operator triggers the operation of an overspeed valve device that distributes a correcting pressure to pilot elements in the control valve assembly thereby restoring the control valve assembly to a central or neutral position to interrupt the motion of the elevator platform. The interruption continues until the control valve system is manually reset.

GENERAL DESCRIPTION OF THE INVENTION

My invention is adapted to be used in the valve system of a hydrostatic engine in an elevator assembly for a marine vessel, although it is capable also of other uses. One environment capable of utilizing the improvements of my invention is shown in my copending application S.N. 702,887 and my Pat. N. 3,347,525.

In my prior disclosures a vertically movable elevator platform is connected by means of a cable and sheave mechanism to a movable piston in a hydrostatic engine. The piston is slidably disposed in a motor cylinder which cooperates with the piston to define a working chamber on one side of the piston. The opposite side is exhausted. The fluid pressure source for the engine communicates with the cylinder through a pressure distributor valve assembly which connects selectively the working chamber to the pressure source or to a low pressure exhaust system. As the working chamber is pressurized, the elevator platform moves vertically. When the working chamber communicates with the exhaust region, the platform lowers itself under its own weight as the cable and sheave mechanism returns the working piston to a position corresponding to the lowest level of the platform.

The control valve system for the engine may include a speed regulator of the type described in my Pat. No. 3,347,525. It is desirable however to provide an overspeed control in the assembly for preventing operation of the elevator at speeds that will create excessive inertia forces or at speeds that would jeopardize the safety of personnel working in the vicinity of the elevator.

In my improved valve system, this overspeed control is achieved by a centrifugally operated valve operator, which is driven about a rotary axis by the driven portions of the engine. The output element for the operator is connected mechanically to a shuttle valve having two operating positions, one of which corresponds to a control valve overrunning position and the other of which corresponds to an inactive, underspeed condition. The shuttle valve is situated in a sub-circuit interconnecting pilot elements on the movable valve element of the main control valve assembly, and the high pressure region of the circuit. When the output element of the valve operator exceeds a calibrated limiting speed, the centrifugal response of the operator triggers the operation of its output element thereby shifting the position of the overspeed shuttle valve from the inactive position to the overruling position. This returns the movable element of the main control valve assembly to the neutral or starting position, which results in termination of travel of the elevator platform. This action occurs regardless of whether the elevator platform is being raised or lowered.

PARTICULAR DESCRIPTION OF THE INVENTION

Figure 1:
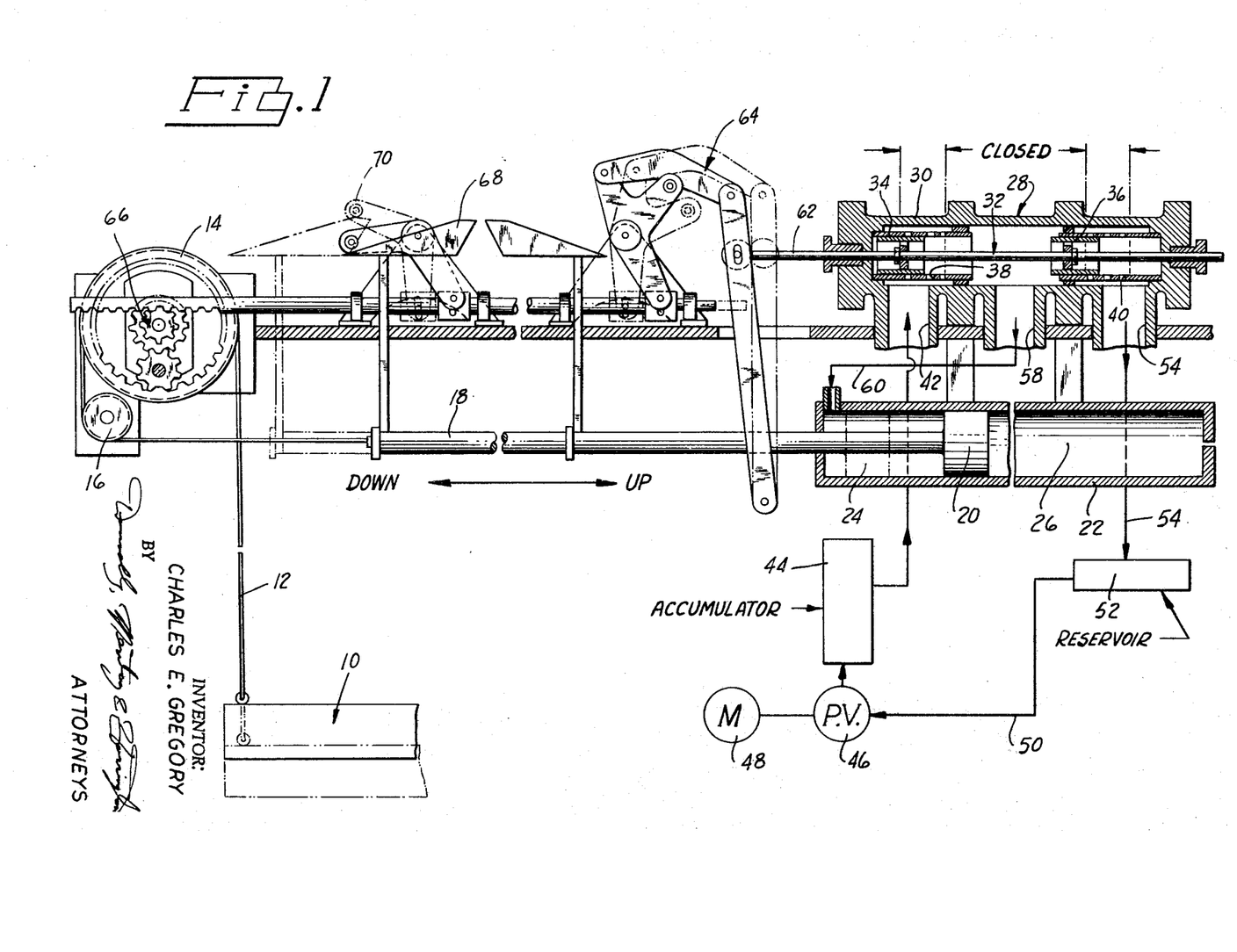
FIG. 1 shows in schematic form a hydrostatic motor and a pressure distributor valve assembly of the type described in my copending Pat. No. 3,347,525. It is this environment with which the improvement of my invention may be used.

In FIG. 1, numeral 10 designates generally an elevator platform. It is supported by cables, one of which is shown at 12. Cable 12 is trained over a sheave assembly, schematically represented by main idler 14 and a cable deflecting idler 16. The cable 12 is trained over the idlers 14 and 16 and is connected to one end of a movable piston rod 18. A piston 20 carries a piston rod 18. It is slidably positioned in the control cylinder 22. The cylinder 22 and the piston cooperate to define a pressure chamber 24. An exhaust chamber 26 is situated on the opposite side of the piston 20. This may be in fluid communication with the atmosphere.

Figure 2:
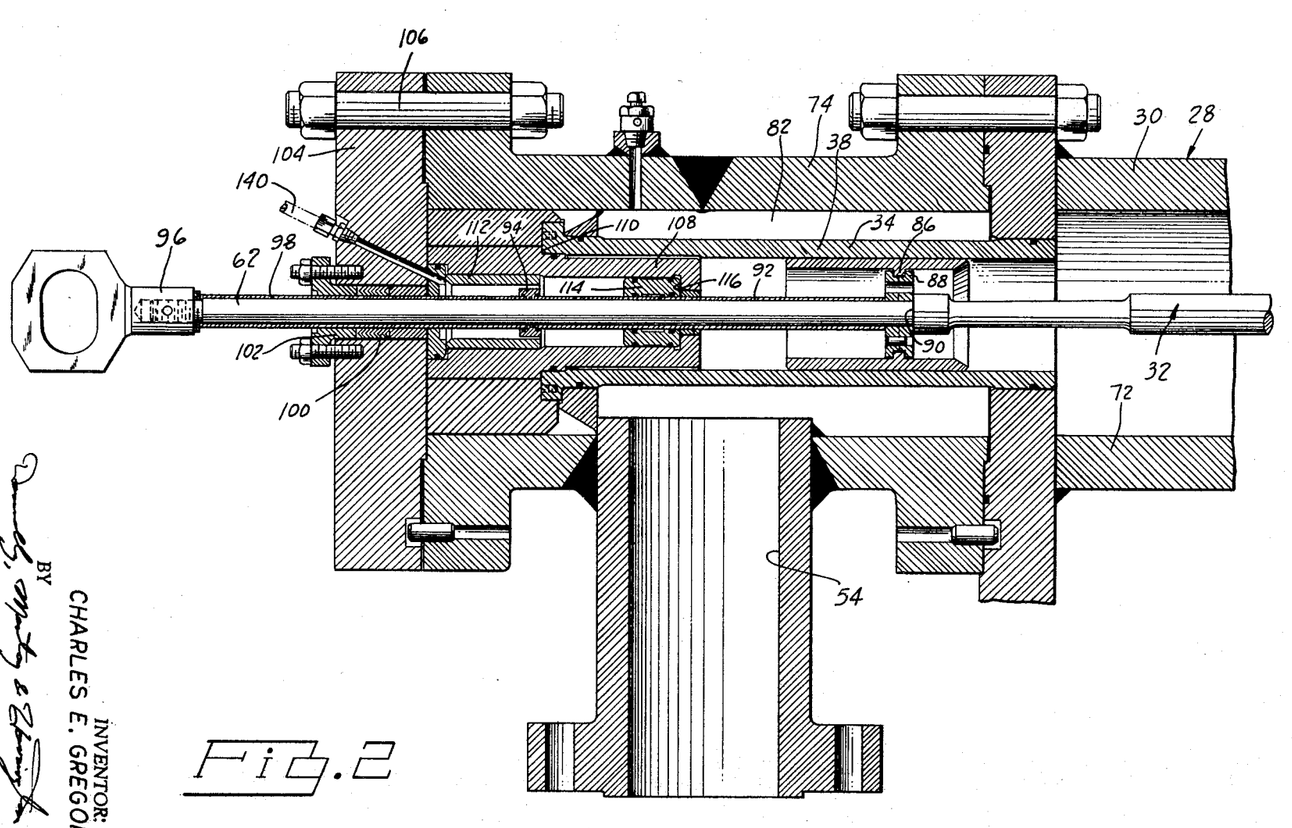
FIGS. 2 and 2A show a longitudinal cross sectional view of the pressure distributor valve assembly used with the fluid motor shown schematically in FIG. 1.
Figure 2A:
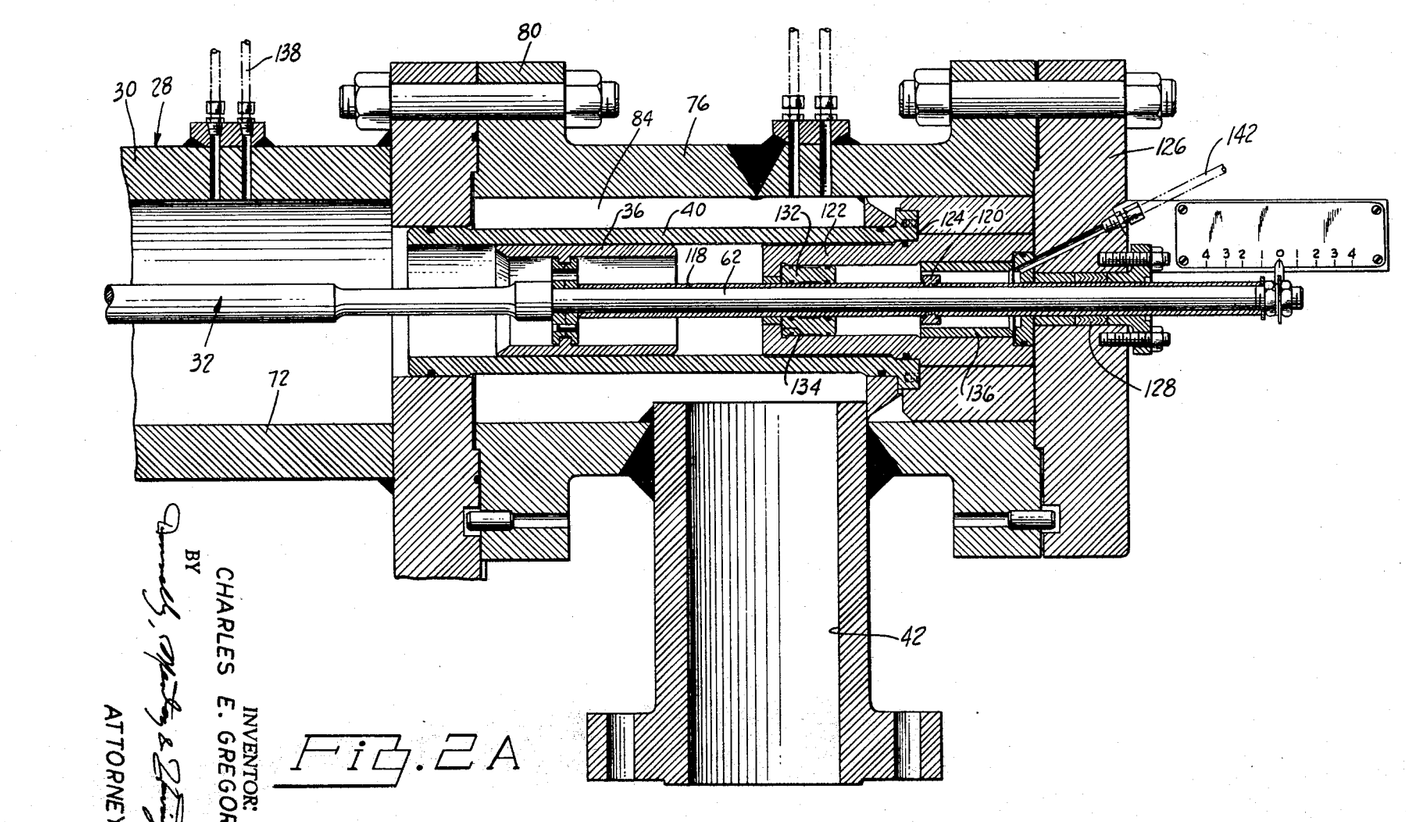

Pressure distribution to the cylinder working chamber 244 is controlled by a pressure distributor valve assembly 28, which will be described with reference to FIG. 2.

The assembly 28 includes a valve cylinder 30 and a compound valve piston 32. The piston 32 includes two valve piston parts 34 and 36. The piston part 34 is situated slidably in an apertured valve sleeve 38 and the piston part 36 is situated slidably in a corresponding apertured valve sleeve 40. An annular space surrounding the valve sleeve 38 is in communication with a high pressure fluid supply port 42 which communicates with accumulator 44. The accumulator is charged with a pump 46 driven by motor 48. The inlet side of the pump is supplied with fluid through a feed passage 50 that communicates with reservoir 52. The annular space surrounding valve sleeve 40 communicates with low pressure ports 54. This communicates with a reservoir through exhaust passage 56.

The outlet port 58 for the cylinder 30 communicates with the interior of the cylinder at a location intermediate the piston parts 34 and 36. It communicates through passage 60 with the left hand side of the piston 20. The valve parts 34 and 36 are carried by a common valve rod 62 extending axially through the cylinder 30. This rod is connected to a suitable valve actuator linkage mechanism indicated generally by reference character 64. The power input element of the linkage system 64 is connected by means of a suitable geared valve actuator 66 which is connected drivably to idler 14, in the manner described in Pat. No. 3,347,525. The linkage mechanism includes also cams 68 and cam followers 70, the latter being carried by movable portions of the sheave assembly. As they are moved, the linkage mechanism is adapted to adjust the position of the valve rod 62. When the rod 62 is adjusted in a left hand direction as viewed in the schematic drawing of FIG. 1, communication between high pressure supply port 42 and the outlet port 58 is increased, and communication between exhaust port 54 and outlet port 58 is decreased. This results in a pressure build-up in port 42, thereby causing the pressure in working chamber 24 to increase and to drive the piston 20 in a direction that will cause the platform 10 to rise.

If the rod 60 is adjusted in the opposite direction, working chamber 24 is brought into increased communication with the exhaust port 54 as communication with the high pressure port 42 is decreased. The platform 10 then may be lowered under its own weight causing the piston 20 to move in a left hand direction, as viewed in FIG. 1.

The cylinder 30 includes a center section 72, a left hand section 74 and a right hand section 76. The ends of the section 30 are flanged to permit a bolted connection with flanged ends of the sections 74 and 76, as shown at 78 and 80, respectively.

The low pressure sleeve 38, which is apertured, cooperates with the end cylindrical section 74 to define an annular low pressure chamber 82 which communicates with the exhaust port 54. Similarly, the high pressure sleeve 40 cooperates with the right hand cylindrical section 76 to define a high pressure annular chamber 84 which communicates with high pressure port 42. In the drawing of FIG. 2, the relative positions of the ports 42 and 54 are interchanged, when compared to the relative positions shown in FIG. 1. The positions shown in FIG. 1 are arranged schematically with the high pressure port on the left hand side merely for convenience in illustrating the movement and operation of the valve.

The valve piston part 34 comprises a cylindrical member that is slidably received within the sleeve 38. The inner periphery of the member 34 is formed with an annular boss 86, on each side of which is positioned a clamping disc 88. One of the discs 88 engages shoulder 90 formed on the valve rod 62, and the other disc 88 engages spacer sleeve 92. The other end of the sleeve 92 engages an annular abutment member 94 surrounding the rod 62. The left hand end of the rod 62 has threadably connected thereto a suitable eyelet 96, which applies a clamping force to the sleeve 98, the latter being a continuation of the sleeve 92. Sleeve 98 engages the annular boss 94 and is slidably received within a fluid seal packing 100 received within shaft opening 102 formed in end wall 104 for the cylinder 30. It is clamped to the end of the cylinder part 74 by suitable bolts, as indicated at 106.

Received within the left hand end of the sleeve 38 is an intermediate sleeve 108. A shoulder 110 on sleeve 108 engages the end of the sleeve 38 whereby the sleeve 108 is clamped against the sleeve 38 and the end plate 104. A cylindrical stop 112 is located in the left hand end of the sleeve 108. In the right hand end of the sleeve 108 is a cylindrical valve return sleeve 114, which surrounds the rod 62 and the sleeve 92.

The cylindrical sleeve 114 engages shoulder 116 formed on the right hand end of the sleeve 108 when it is shifted in the right hand direction, and it engages the end of the stop 112 when it is shifted in the left hand direction. When the sleeve 114 is shifted in the left hand direction, the collar 94 is returned to the position shown in FIG. 2 if it previously has been displaced in a right hand direction.

The construction of the valve part 36 is similar to the construction of valve part 34. Like the valve part 34, the valve part 36 is joined to the rod 62. The right hand end of the rod 62 is surrounded by the sleeve 118 which is clamped between the valve part 36 and the collar 120 carried by the rod 62.

Located within the right hand end of the sleeve 40 is a cylindrical insert 122 which is held axially fast with respect to the sleeve 40 by shoulder 124 and by an end wall 126, which closes the right hand end of the cylinder 30.

Wall 126 is formed with a seal opening which receives a seal packing 128 surrounding the right hand end of the rod 62.

Slidably disposed within the sleeve 122 is sleeve 132, which surrounds the rod 62 and the sleeve 118. It is adapted to engage shoulder 134 when it is shifted in a left hand direction. It is engaged by the collar 120 when it is shifted in a right hand direction. Movement of the sleeve 132 in a right hand direction is limited by a positioning sleeve 136 which corresponds to the sleeve 112.

Figure 3:
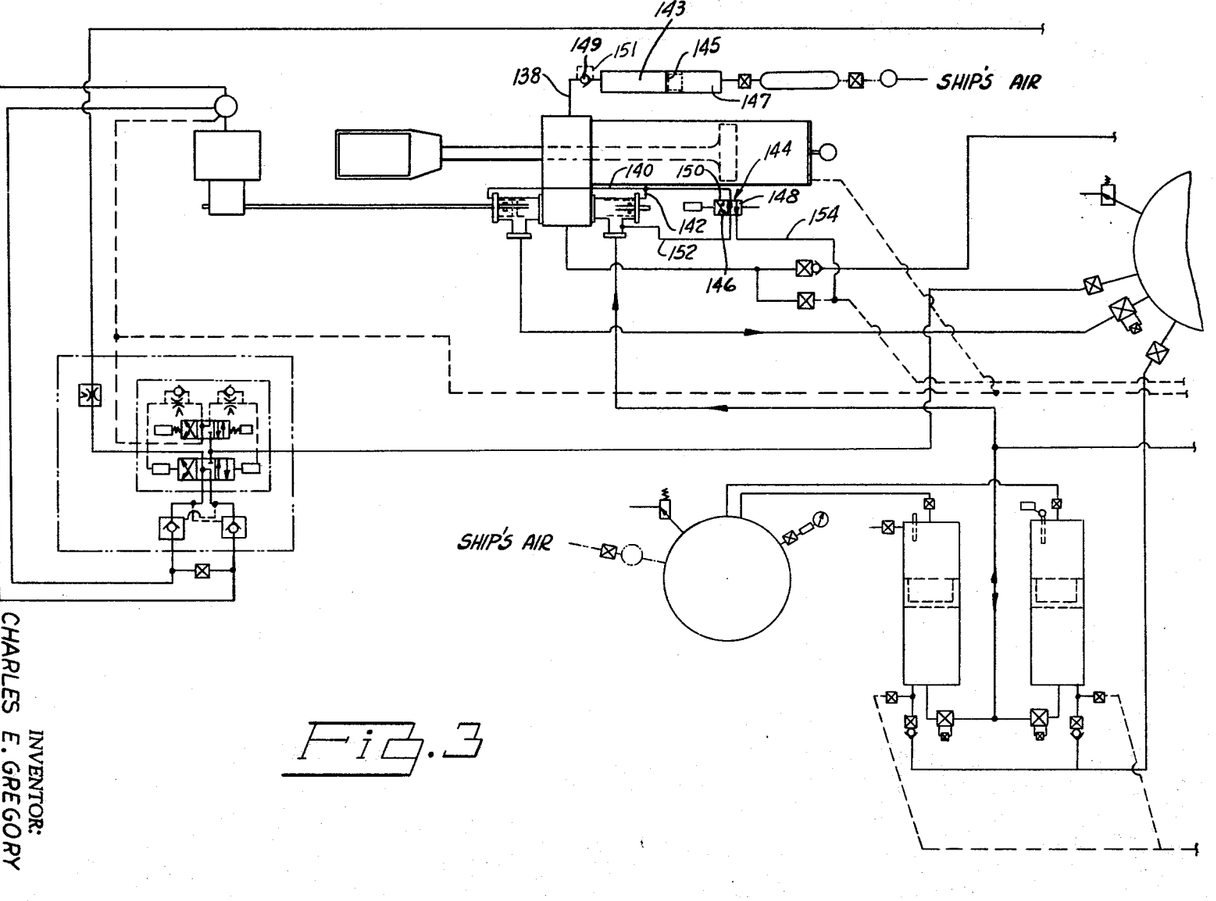
FIG. 3 is a schematic circuit diagram showing the overspeed control valve system in combination with the valve arrangement of FIG. 2.
Figure 4:
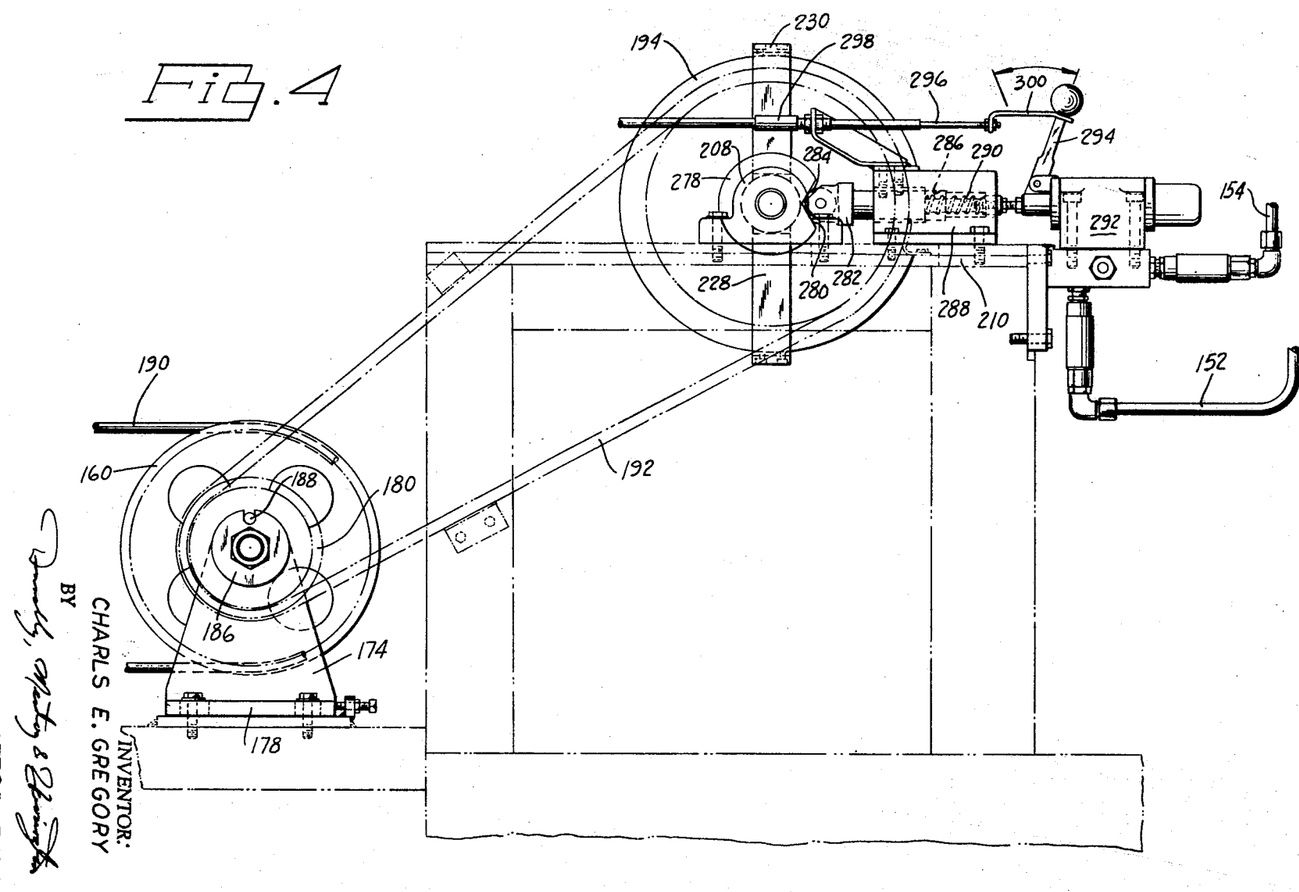
FIG. 4 is an assembly view of the overspeed control valve mechanism of FIG. 3.

The region between the valve parts 34 and 36 communicates with the pressure bleed-off passage 138. The low pressure chamber 82 is in fluid communication with pressure passage 140. Pressure passage 142 communicates with the high pressure annular cavity 84. Passage 142 communicates with an accumulator chamber 143 as indicated in FIG. 3. This chamber is defined in part by movable piston 145, which is subjected to a controlled air pressure in the pressurized air chamber 147. A one-way flow check valve 149 is disposed between the accumulator chamber 143 and the pressure chamber 84 thereby permitting passage of pressure from accumulator chamber 143 to the working chamber 24 for the hydrostatic motor.

Chamber 143 is charged during normal operation of the elevator by a bleed passage 151 which by-passes the one-way flow check valve 149. The accumulator 143 therefore assures that a minimum pressure will be maintained in the chamber 24, thus preventing the development of a slack condition in the hoisting cable and sheave assembly for the elevator platform.

The high pressure feed passage 142 communicates with an overspeed shuttle valve 144. Shuttle valve 144 comprises a movable valve element 148 having two operating positions 148 and 150. When the valve 144 assumes the position 148, communication is established between passage 142 and 152, the latter extending to the high pressure passage on the high pressure side of the system.

When the valve 148 assumes the position 146, communication is established between the passage 142 and low pressure passage 154. Whenever passage 142 is pressurized, passage 140 is also pressurized since they are connected together. Thus, whenever the shuttle valve 144 is moved to the position shown in FIG. 3, the compound valve 32 is returned to the neutral position shown in FIG. 2 and the lifting motion of the motor is stopped or the platform lowering motion of the motor is stopped, depending upon whether the valve assembly 32 is moved to the right or to the left.

If the motor is being lowered, fluid is exhausted from the working chamber of the hydraulic engine and through the center section of the housing 30 to the exhaust port 54. This fluid passes through central apertures formed in the valve part 34. On the other hand, when the hydraulic engine is raising the platform, fluid pressure passes from port 22 and through the high pressure valve sleeve 40 and then through the central apertures formed in the valve part 36 to the central region 30 which, as mentioned earlier, communicates with the working chamber of the hydrostatic engine.

Whenever the platform motion, regardless of whether it is up or down, exceeds a predetermined speed, the shuttle valve 145 is actuated. This is done by the overspeed mechanism that will be described now with reference to FIGS. 4–8.

Figure 5:
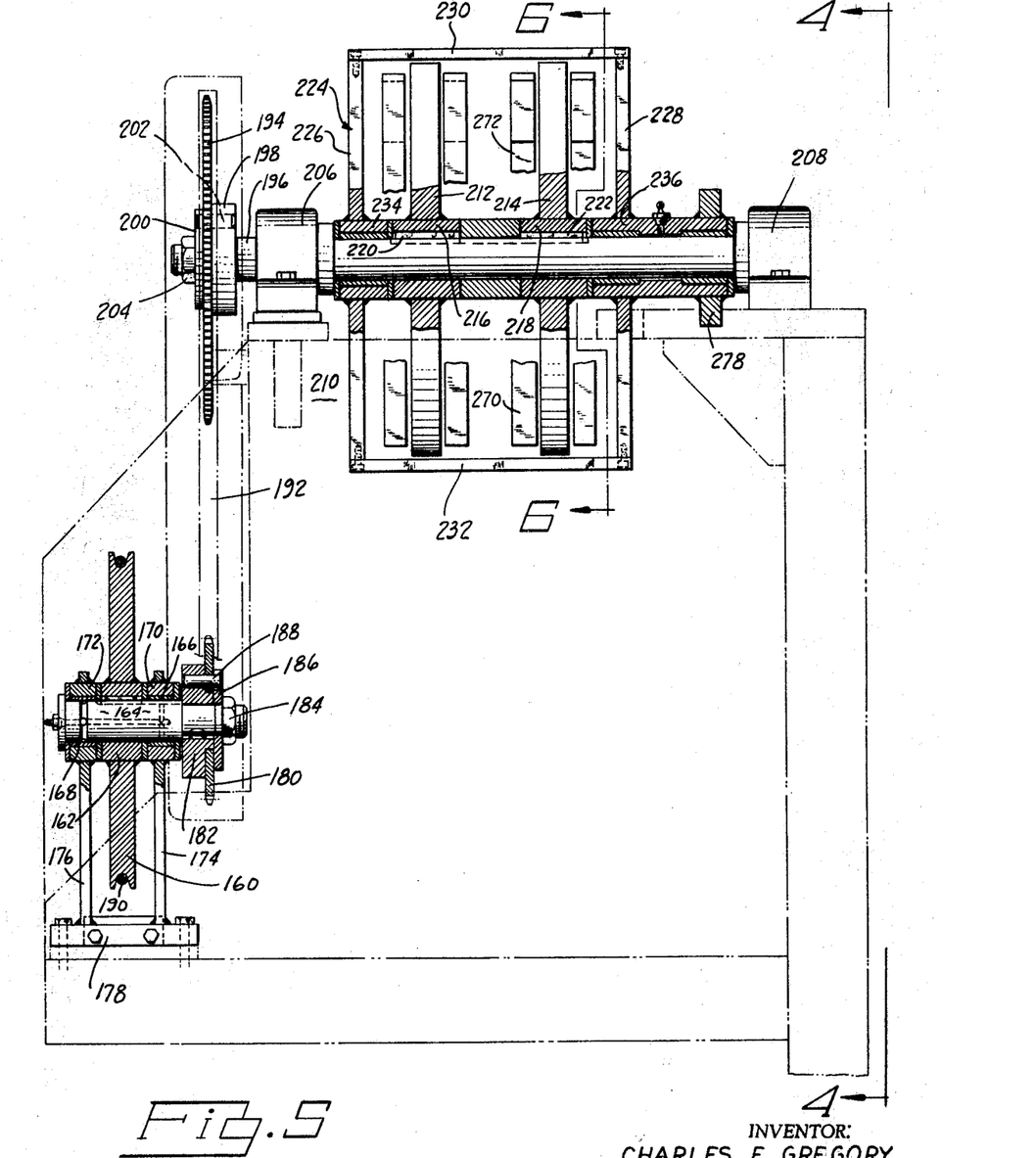
FIG. 5 is an end view partly in section showing the structure of FIG. 4.

In FIG. 5, the drive pulley 160 has a hub 162 that is keyed to a driving shaft 164. Shaft 164 is supported by spaced bushings 166 and 168, received within bearing collars 170 and 172, respectively. These in turn are supported by a pair of bracket plates 174 and 176, situated on either side of the pulley 160. These plates are supported by a base 178.

On one side of the plate 174 is a sprocket wheel 180 having a hub 182 which is keyed to the right hand end of the shaft 164. The hub 182 is held axially fast on the shaft 164 by means of lock nut 184. A locating washer 186 is located on one side of the hub 182. The washer 186, the hub 182 and the sprocket wheel 180 are pinnned together for rotation in unison by a drive pin 188.

The periphery of the pulley 160 is grooved to permit a driving connection with a cable 190. The cable 190, in turn, is connected to movable parts of the hydrostatic engine and sheave assembly. As the engine and sheave assembly is actuated, the cable 190 drives the sprocket wheel 160 in either one direction or the other, depending upon whether the platform is raised or lowered. Displacement of the sprocket wheel 180 then is directly proportional to the change in the vertical position of the platform, and its rate of rotation is also directly related to the rate of movement of the platform.

The sprocket 180 is connected by means of a side chain 192 through a driven sprocket wheel 194. This is connected drivably to shaft 196. The connection is made by a hub 198 and a drive washer 200 which are pinned to the sprocket wheel 194 by drive pin 202. The hub 198 is keyed to the shaft 196. The assembly is held axially fast by a lock nut 204.

Shaft 196 is end supported by bearing collars 206 and 208 situated at opposite ends of the shaft 196. The collars 206 and 208 in turn are supported by base structure 210.

Drive plates 212 and 214 are connected drivably to the shaft 196. Each of them has a hub, as shown at 216 and 218, through which the shaft 196 extends. Each hub is connected by means of a key to the shaft 196 as shown at 220 and 222, respectively.

A trip bar assembly identified generally by reference character 224 surrounds the drive plates 212 and 214. It includes a pair of end plates 226 and 228 which are tied together by a pair of trip bars 230 and 232.

The end plates 226 and 228 are formed with hubs 234 and 236 which in turn are journalled on the shaft 196 by means of bushings. A pair of centrifugally operated levers 238 and 240 is carried by the drive plate 214. Lever 238 is pivoted to the drive plate 214 by a pivotal connection shown at 242. A corresponding pivotal connection between lever 240 and the plate 214 is shown at 244.

Lever 238 has an extension arm 246 which is connected to a clevis element 248 by means of pin 250. Element 248 is threadably connected to a cross pin 252. This pin is connected at its other end to clevis 254 which is pivoted by means of pin 256 to an intermediate location on the lever 240. A reaction bracket 258 carried by member 214 provides a reaction point for spring 260. The tension of the spring 260 can be controlled by adjusting nut 262 on which the spring 260 is seated.

Angular displacement of the lever 238 about the axis of the connection 242 is limited by a cross bolt 264 and collar 266, the latter being received in an oversized opening 268 in the plate 214.

Located on the opposite side of the plate 214 is a second set of centrifugally operated levers which correspond in structure and in function to the levers 238 and 240. These levers are indicated generally by reference characters 270 and 272 in the FIG. 5 construction. They are tied together by a cross pin in a manner similar to the cross pin described with reference to FIG. 6.

The radially outward extremity of the lever 238 is formed with a nose 274 which forms one clutch element. A corresponding nose 276 formed on the end of the lever 240 forms a second clutch element.

Figure 6:
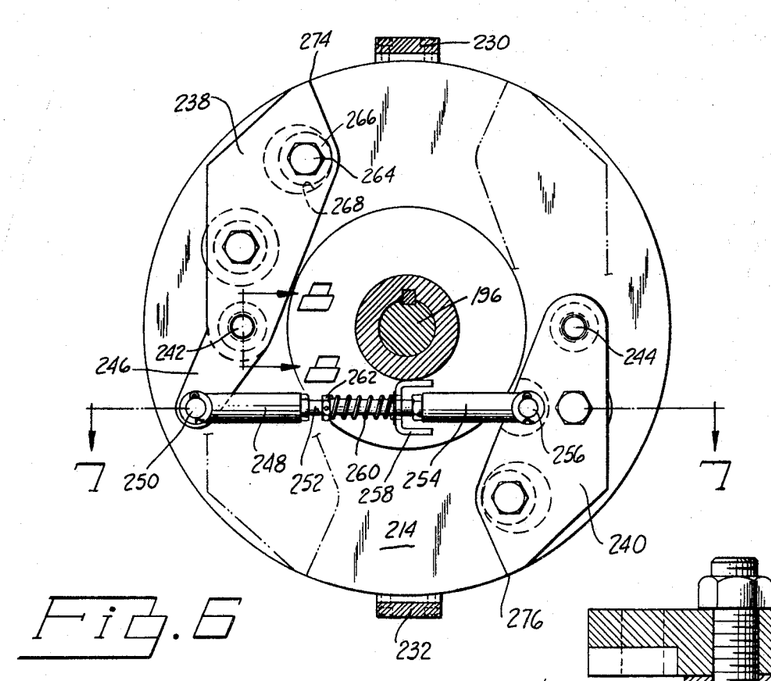
FIG. 6 is a cross sectional view taken along the plane of section line 6—6 of FIG. 5.
Figures 7, 8:
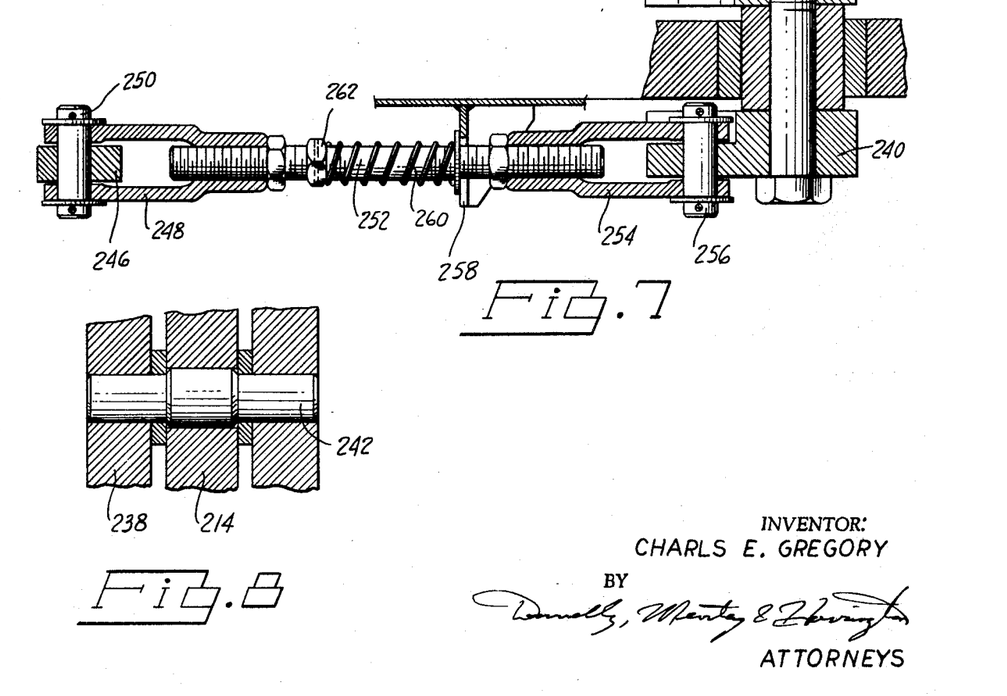
FIG. 7 is a cross sectional view taken along the plane of section line 7—7 of FIG. 6.
FIG. 8 is a cross sectional view taken along the plane of section line 8—8 of FIG. 6.

Upon rotation of the shaft 196 in a clockwise direction as viewed in FIG. 6, the centrifugally operated levers 238 and 240, after a precalibrated speed is reached, will move radially outwardly thereby causing the clutch elements 274 and 276 to engage the sides of the trip bars 230 and 232. This then will cause the hubs 236 to rotate about the axis of the shaft 196.

The centrifugally operated levers 270 and 272 function in a manner similar to the mode of operation of levers 238 and 240, although they are designed to engage the trip bars 230 and 232 upon rotation of the shaft 196 in the opposite direction.

The drive plate 212 carries two pairs of centrifugally operated levers that resemble in design and function the levers 238, 240, 270 and 272.

The hub 236 drives the rotary cam 278. This is formed with a cam recess 280 on its periphery. A cam follower 282 having a cam wheel 284 registers with the recess 280 when the trip bars 230 and 232 are in the positions shown in FIGS. 5 and 6. Cam follower 282 is positioned slidably in an opening 286 formed in a carrier body 288. This body in turn is supported by a base structure 210. The follower 282 normally is urged in a left hand direction as viewed in FIG. 4 by cam spring 290.

The shuttle valve 144 is mounted in axial alignment with the cam follower 282. It also is supported by the base 210. The movable valve element 146 is slidably positioned in the body portion 292 of the valve 144.

A personally operable lever 294 is pivoted on the valve body portion 292 of the valve 144. One end of the lever 294 can be connected to the movable valve element 146. The valve element 146 then can be restored to the normal underspeed position following automatic shifting movement of the valve element 146 to the overspeed position.

In addition, the automatic override provided by the speed control mechanism shown in FIGS. 4 through 8 comprises a control cable 296 slidably positioned in a cable support 298. It is connected by means of a lost motion connection to the lever 294 as shown at 300. The lever 294 can be moved independently of the cable 296 if such motion is desired because of the elongated slot in the connecting element shown at 300 through which the lever 294 extends.

The cable 296 can extend to a convenient location where it is under the control of the elevator operator. If the platform is moving at a speed that exceeds a predetermined safe speed, the trip bars 230 and 232 will be engaged by the centrifugally operated levers, thereby rotating the cam 278 and moving shuttle valve element 147 in a right hand direction thereby exhausting the passages 140 and 142. This relieves the pressure acting on the left hand side of the sleeve 114 and the right hand side of the sleeve 132. The pressure in the central region of the valve assembly 28 then will act on each of these sleeves so that sleeve 114 will engage collar 94 and the sleeve 132 will engage the collar 120. This then will tend to restore the compound valve assembly and the rod 32 to a central, neutral position which will cause the travel of the elevator platform to cease. Collars 94 and 132 are adapted at that time to adjust the shaft 32 in either one direction or the other. Thus they are effective to shift the valve assembly to a neutral position regardless of whether the overspeeding occurs during rising motion of the platform or during lowering motion.

After the shuttle valve 144 is tripped following overspeeding, it may be restored to the original setting manually in the manner described previously.

Having thus described a preferred form of my inven- tion, what I claim and desire to secure by U.S. Letters Patent is:

1. An overspeed control for a hydrostatic engine and sheave assembly comprising a pressure cylinder and a working piston situated in said cylinder and defining therewith a working chamber, a platform, cable and sheave means for connecting operatively said platform with said piston whereby said platform is raised as pressure is distributed to said working chamber, conduit structure communicating with said working chamber for distributing pressure thereto, pressure distributor valve means in said conduit structure comprising a high pressure port and low pressure port, an outlet port in said conduit structure communicating with said working chamber, a movable valve element having a range of operating positions as it is moved from one position to the other with respect to said ports, said valve increasing the degree of communication between said high pressure port and said outlet port and decreasing the degree of communication between said exhaust port and said outlet port upon movement thereof in one direction, said valve decreasing the communication between said outlet port and said high pressure port and increasing the degree of communication between said exhaust port and said outlet port as it is moved in the other direction, pressure areas on said movable valve, control passage means establishing a fluid connection between said pressure areas and said high pressure port including shuttle valve means adapted to selectively interrupt and establish a connection between said high pressure port and said areas thereby establishing and disestablishing a force on said valve that tends to shift said valve to a neutral, pressure-distribution interrupting position, said centrifugally operated valve operator means having centrifugal elements connected drivably to driven portions of said engine sheave assembly for triggering the operation of said shuttle valve means as said elevator is overspeeded.

2. The combination set forth in claim 1, wherein said valve comprises: a pair of pressure sleeves situated at spaced locations on either side of said outlet port, said passage including branch portions extending to opposite sides of said sleeves, said sleeves being adapted to engage parts of said valve upon shifting movement thereof under the influence of a pressure differential thereacross, both of said branch passages being pressurized when said shuttle valve means is moved to the pressure distributing position.

3. The combination set forth in claim 1, wherein said valve comprises: a centrifugally operated valve operator comprising movable lever elements mounted for rotation about a rotary axis, a mechanical drive connecting said lever elements to driven portions of said engine and sheave assembly, a trip bar situated in radially spaced relationship with respect to said lever elements, said trip bars being mounted for rotation about an axis common to the axis of rotation of said centrifugally operated levers, and a mechanical connection between said trip bars and said shuttle valve whereby said shuttle valve is shifted as said centrifugally operated levers are moved radially outwardly and engage said trip bars as said platform is overspeeded.

4. The combination set forth in claim 2, wherein said valve comprises: a centrifugally operated valve operator comprising movable lever elements mounted for rotation about a rotary axis, a mechanical drive connecting said lever elements to driven portions of said engine and sheave assembly, a trip bar situated in radially spaced relationship with respect to said lever elements, said trip bars being mounted for rotation about an axis common to the axis of rotation of said centrifugally operated levers, and a mechanical connection between said trip bars and said shuttle valve whereby said shuttle valve is shifted as said centrifugally operated levers are moved radially outwardly and engage said trip bars as said platform is overspeeded.

5. The combination set forth in claim 1, wherein said valve comprises: a pair of axially spaced valve sleeves, one valve sleeve registering slidably with said high pressure port and the other valve sleeve registering slidably with said low pressure port, the intermediate region of said valve assembly between said valve sleeves communicating with said working chamber, one side of each valve sleeve being exposed to the fluid pressure in said intermediate region through the adjacent valve sleeve.

6. The combination set forth in claim 2, wherein said valve comprises: a pair of axially spaced valve sleeves, one valve sleeve registering slidably with said high pressure port and the other valve sleeve registering slidably with said low pressure port, the intermediate region of said valve assembly between said valve sleeves communicating with said working chamber, one side of each valve sleeve being exposed to the fluid pressure in said intermediate region through the adjacent valve sleeve.

7. The combination set forth in claim 3, wherein said valve comprises: a pair of axially spaced valve sleeves, one valve sleeve registering slidably with said high pressure port and the other valve sleeve registering slidably with said low pressure port, the intermediate region of said valve assembly between said valve sleeves communicating with said working chamber, one side of each valve sleeve being exposed to the fluid pressure in said intermediate region through the adjacent valve sleeve.

8. The combination set forth in claim 4, wherein said valve comprises: a pair of axially spaced valve sleeves, one valve sleeve registering slidably with said high pressure port and the other valve sleeve registering slidably with said low pressure port, the intermediate region of said valve assembly between said valve sleeves communicating with said working chamber, one side of each valve sleeve being exposed to the fluid pressure in said intermediate region through the adjacent valve sleeve.

References Cited

UNITED STATES PATENTS

| | | | |
|---|---|---|---|
| 3,314,657 | 4/1967 | Prudhomme | 254—189 |
| 3,347,525 | 10/1967 | Gregory | 187—26 |

HARVEY C. HORNSBY, Primary Examiner